United States Patent [19]

Cunningham

[11] 4,268,390
[45] May 19, 1981

[54] STORM DRAIN SUMP FILTER

[76] Inventor: William T. J. Cunningham, 528 E. 43rd St., Brooklyn, N.Y. 11203

[21] Appl. No.: 74,091

[22] Filed: Sep. 10, 1979

Related U.S. Application Data

[63] Continuation-in-part of Ser. No. 960,618, Jan. 2, 1979, abandoned.

[51] Int. Cl.³ ............................................. B01D 23/04
[52] U.S. Cl. ................................... 210/232; 55/374; 55/381; 210/448; 210/451; 210/459; 210/464; 210/477; 210/483
[58] Field of Search ...................... 210/232, 464–467, 210/469, 473, 474, 475, 483, 507, 508, 448, 451, 459, 477; 55/361, 374, 376, 381, 368, 378, 380, 305, 304

[56] References Cited

U.S. PATENT DOCUMENTS

| | | | |
|---|---|---|---|
| 122,209 | 12/1871 | Ashman et al. | 210/164 |
| 589,772 | 9/1897 | Woodbury | 55/305 |
| 1,070,773 | 8/1913 | Callahan | 210/164 |
| 1,757,834 | 5/1930 | Haegler | 55/304 |
| 2,433,423 | 12/1947 | Broadman | 210/483 X |
| 2,800,194 | 7/1957 | Peek | 55/380 |
| 2,975,863 | 3/1961 | Sosnowich | 55/381 |
| 3,443,366 | 5/1969 | Schwab | 55/376 |
| 3,713,539 | 1/1975 | Thompson | 210/164 |
| 3,959,137 | 5/1976 | Kirsgalvis | 210/232 |
| 3,986,958 | 10/1976 | Cattano | 210/169 |
| 4,089,664 | 5/1978 | Noland | 55/374 |

Primary Examiner—Theodore A. Granger
Attorney, Agent, or Firm—Friedman, Goodman & Teitelbaum

[57] ABSTRACT

A filter for use within a storm drain sump which has a fluid outlet through a wall of the sump, the filter includes a bag-like body member having a cylindrical body portion fabricated from resilient mesh-like synthetic material. A base portion of the filter defines a toroid-shaped section. A weighted material is placed within the toroid-shaped section. Wedge-shaped spacers are axially aligned and secured to an outer face of the cylindrical body portion of the filter. A suspension plate is secured to the body member to support the filter in the storm drain sump.

5 Claims, 7 Drawing Figures

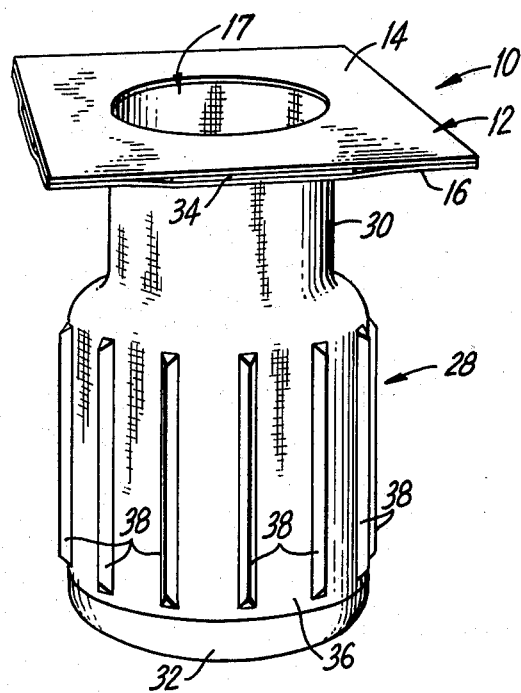
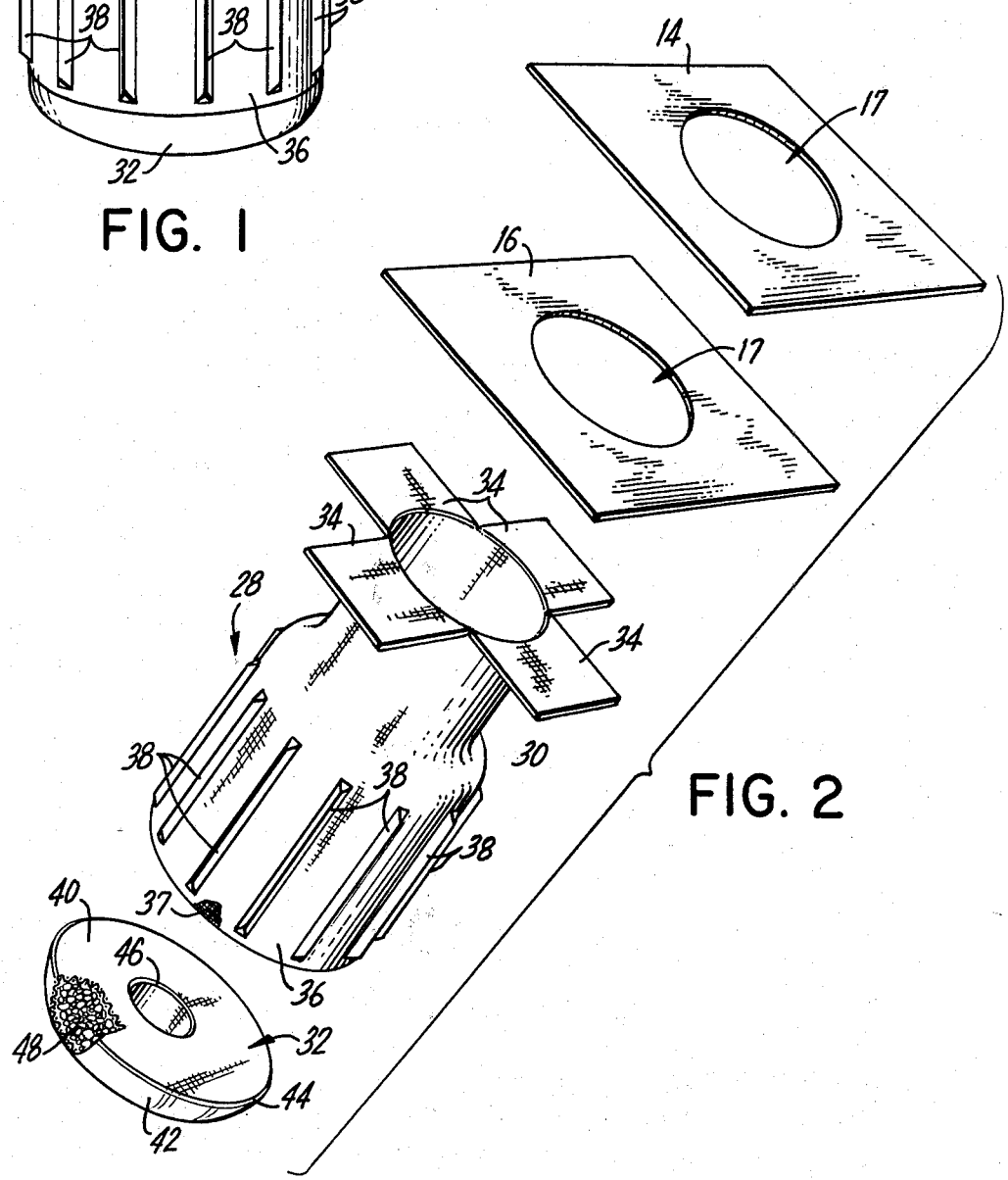
FIG. 1
FIG. 2

STORM DRAIN SUMP FILTER

RELATIONSHIP TO OTHER APPLICATION

This application is a continuation-in-part of application Ser. No. 960,618, which was filed on Jan. 2, 1979 for "The Storm Drain Filter Enhancer" by the same inventor, now abandoned. All the information contained within the above-mentioned application is herein incorporated by reference.

BACKGROUND OF THE INVENTION

This invention relates to drain filters and more particularly to a drain filter for use with a storm drain having a sump with an outflow pipe.

Many urban and suburban buildings have at least one storm drain located near their foundation. These storm drains are designed to remove excess water which flows around the base of the building during rain storms and snow melts, thereby preventing water damage. These drains generally consist of a concrete, mortar, brick or cement lined sump having a perforated metal storm drain cover. A drain pipe generally is located in the sump beneath the perforated cover, extending through a wall of the sump into a main building drainpipe. The main building drainpipe generally directs the flow of all water and waste materials passing through the building plumbing outwards into a sewer system.

At present, there is very little effective filtering of foreign objects from the water flowing through the sump. The storm drain cover is designed to filter any items which the water is carrying with it, such as leaves, twigs, paper, etc. However, any items smaller than the perforations in the storm drain cover will pass through those openings along with the flowing water. The heavier items will fall to the bottom of the sump and accumulate there. The lighter items tend to remain on the surface of the water in the sump, escape through the outflow pipe and flow into the building plumbing. The heavier items tend to clog the whole interior of the sump after a period of time and the lighter items tend to clog the drainpipe leading from the sump. The results of such clogging can include ground flooding and water damage to the building.

At present, in order to clean the storm drain, it is necessary to remove the storm drain cover and manually clean the interior of the sump. Any debris which has passed into the sump outflow pipe can only be removed with plumber's tools. If the debris has penetrated into the main plumbing and clogs the pipes, very expensive repairs would be required.

At present, the only apparatus for filtering debris from runoff water before it enters the storm drain sump consists of the perforated cover which rests upon the upper edge of the side walls of the sump. The Swaskey patent, U.S. Letters patent No. 4,045,346 discloses such a perforated storm cover and a non-filtering funnel tube there-beneath. There is no disclosure, however, of a method of filtering the water in the sump. The Cattano patent, U.S. Letters patent No. 3,986,958 discloses a filter for use in a swimming pool. The filter has inner and outer concentric filtering walls. These walls have differing densities and complimentary opening in their base. The openings in the base are controlled by a flapper valve. The base portion of the outer complimentary filter rests upon a stainless steel metallic support.

There currently is no storm drain filtering device which can be easily installed, effectively filter the incoming water, be easily removed from the storm drain sump and quickly cleaned or replaced; yet is also light in weight and capable of being used with storm drains having different interior dimensions.

SUMMARY OF THE INVENTION

Accordingly, it is an object of the present invention to provide an improved storm drain filter.

Another object of the present invention is to provide a lightweight storm drain filter which can be utilized in storm drain sumps of varying sizes.

A further object of the present invention is to provide a storm drain filter with improved filtering capacity.

An additional object of the present invention is to provide a lightweight storm drain filter having a flexible mesh-like body portion and a relatively flexible, weighted base portion which prevents a bunching up of the lightweight, mesh-like material and keeps the bag essentially open at all times.

Still another object of the present invention is to provide a storm drain filter which can be easily assembled and inserted into a storm drain sump.

Briefly, the invention describes a filter member having an upper suspension plate and depending filter bag constructed of a resilient mesh-like material. The bag itself has a neck portion, a body portion having a cylindrical side wall and a base portion. The neck portion includes a plurality of tab portions projecting axially therefrom. The cylindrical side wall of the filter bag has a plurality of sump wall spacers affixed in parallel axial alignment around its circumference. The base portion of the filter bag includes a toroid-shaped weighted section secured to the bottom wall of the body portion.

The suspension plate includes two complimentary plate-like portions having concentric openings therethrough. The projecting tab portions of the filter bag neck are adhered between the lower plate portion and the upper plate portion. The depending filter bag is then placed in a storm drain sump. The edges of the plate-like portions rest upon an upper wall flange of said sump, thereby supporting the depending filter within the sump. Thereafter, a perforated storm drain cover is placed over the suspension plate and the unit is ready for operation.

In a preferred embodiment of the invention, the debris laden water initially flows through the perforated storm drain cover which only filters our the largest objects. Thereafter, the water flows through the concentric openings of the upper and lower suspension plate portions and through the neck of the filter bag into the filter itself. The neck of the filter bag is also fabricated from the same resilient mesh-like material as the bag itself, preferably a synthetic material such as plastic. The dimensions of the openings in the mesh-like material are selected so as to effectively filter the debris from the water which flows therethrough. Typical debris would include twigs, grass, leaves and sand. If the expanded filter bag is relatively larger than the sump, the spacers prevent the bag from abutting against the sump walls, thereby providing continual filtering.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a perspective view of the storm drain filter assembly, according to the present invention;

FIG. 2 is an exploded perspective view of the storm drain filter;

DESCRIPTION OF THE PREFERRED EMBODIMENT

Figure 3:
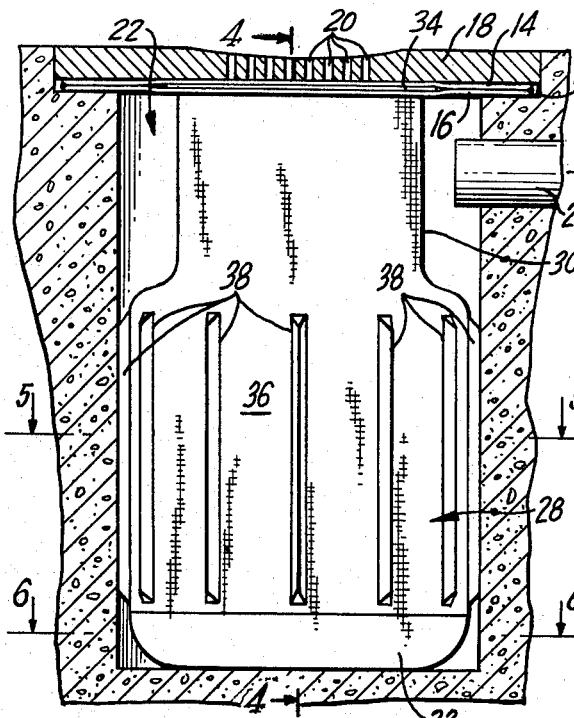
FIG. 3 is an elevational view of the filter bag within a storm drain.

Referring now to the drawings, specifically to FIG. 1 and 2, the device according to the present invention comprises a filter shown generally at 10, including a suspension plate assembly 12. The suspension plate assembly 12 includes an upper suspension plate 14 and a lower suspension plate 16. These plates are preferably constructed of lightweight plastic, or any other suitable synthetic material, and have complimentary openings 17 therethrough. These openings 17 are the inlet port through which water to be filtered enters the filter 10.

Figure 4:
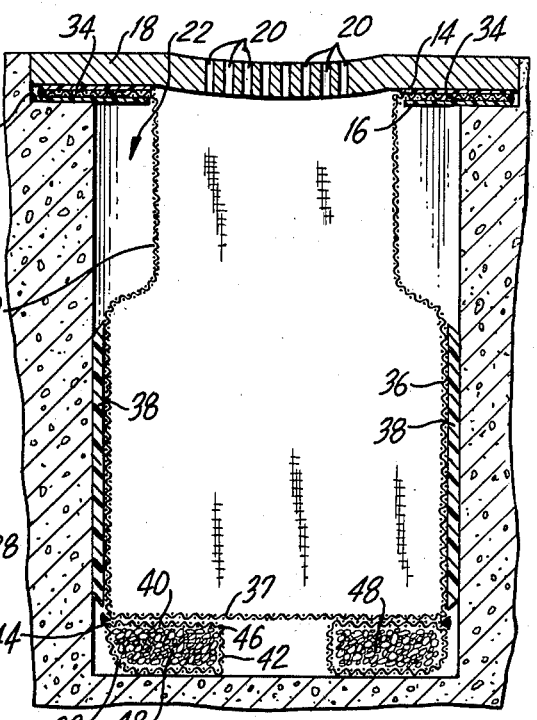
FIG. 4 is a view taken along line 4—4 of FIG. 3.

As best shown in FIGS. 3 and 4, the upper and lower suspension plates 14, 16 preferably have relatively equivalent dimensions to the drain plate cover 18. The standard drain plate cover 18 is provided with a series of perforations 20 through which the water will flow into the storm drain sump, shown generally at 22. These perforations 20 function as primary filters. The storm drain sump 22 generally has an upper perimeter flange or seat 24 upon which the upper and lower suspension plates 14, 16 will rest. The drain plate cover 18 then rests nestingly upon the suspension plate assembly 12 so that primary filtering perforations 20 are directly aligned over the openings 17.

When debris laden water flows through the drain plate cover 18, it flows downward through complimentary openings 17 of the filter 10. After the water is filtered, it passes out of the sump through a standard outlet pipe 26 positioned in an upper portion of a side wall of the sump 22 to provide egress for the filtered water.

The filter portions, such as the neck, body and base, are preferably made from a resilient, mesh-like, relatively water insoluble synthetic material, such as plastic. As the water flows into the filter, the mesh-like material filters the debris which is too small to have been filtered by the perforations 20 of drainplate 18, where the openings in the mesh-like material are smaller than the perforations 20.

The tab-like portions 34, which project from the neck 30 of the filter 10, are inserted upward through aperture 17 of lower suspension plate 16 and then extended radially outward over the upper surface of the lower plate, where the tab-like portions are formed from the neck 30 by making four cuts therein. Tabs 34 and the upper surface of lower plate 16 are then adhered to each other by a suitable adhesive so that the filter bag is depending from opening 17. Thereafter, the lower surface of upper plate 14 is aligned with the upper surface of lower plate 16 and they are then adhered to each other by again using a suitable adhesive. As best shown in FIG. 1, the filter bag body 28, depending from the neck of the filter, communicates with the neck 30 and the openings 17 of suspension plate assembly 12 to receive the incoming debris laden water which passes through the drain plate 18.

The suspension plate, with the filter bag body 28 depending therefrom, is placed upon the upper perimeter flange 24 of the storm drain sump and the filter bag body is directly centered within the sump. The drain plate cover 18 is thereafter placed into position and the centrally located drain plate cover perforations 20 channel the incoming water into the filter 10.

The main body of the filter 10 includes a cylindrically shaped side wall portion 36 and a bottom wall 37 fabricated from the above-mentioned resilient, mesh-like, synthetic material. Storm drain sumps are not uniform in dimension and vary in size, depending upon the manufacturer. The diameter of the cylindrically shaped main-body portion 36 is selected to fit within a standard range of storm drain interior dimensions. One advantage of selecting a resilient mesh-like material for use in the filter is that one sized filter can be inserted into storm drain sumps of different sizes and still filter effectively.

Figure 5:
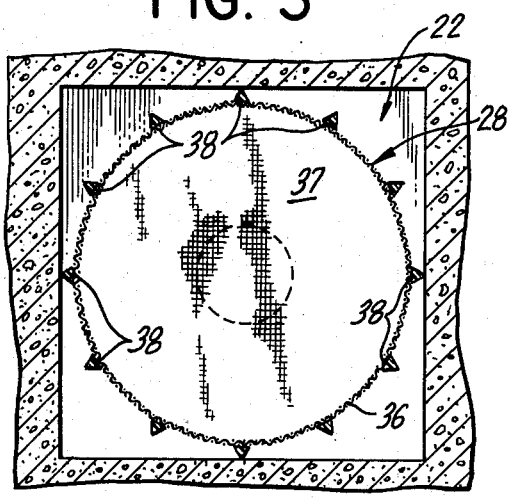
FIG. 5 is a view taken along line 5—5 of FIG. 3.

In order for a filter to function effectively within a storm drain sump, it is necessary that the expanded filter, containing debris laden water, does not abut against the sump so that the filtering action of the mesh-like material is not curtailed. To prevent the cylindrical portion 36 of the filter 10 from contacting the sump walls so that filtering efficiency is not impaired, a plurality of longitudinally disposed spacer fins 38 is secured to the outer surface of the filter body, as shown most clearly in FIG. 1. These spacer fins 38 are preferably wedge-shaped, plastic ribs bonded or fused in a parallel relationship to each other upon an outer surface of the filter, being disposed around a longitudinal axis of the cylindrical body portion 36 of the filter 10. As shown in FIGS. 3, 4 and 5, these spacers 38 provide a space between the bag body 36 and the sump walls, thus allowing the bag to freely filter the drain water. The spacer fins 38 provide that a substantial filtering area on the cylindrical surface 36 of the filter will be spaced apart from the sump walls.

Figure 6:
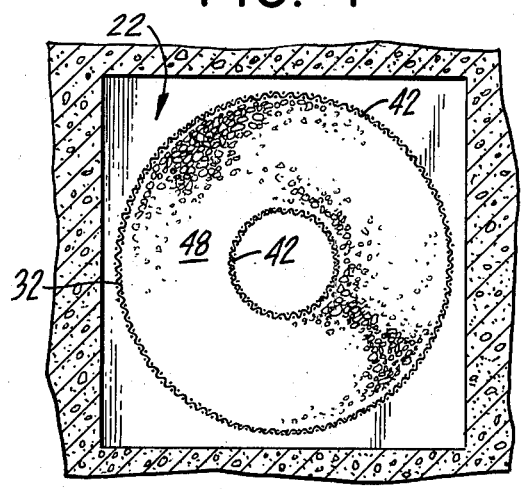
FIG. 6 is a cross-sectional view of the base portion.

The base portion 32 of the filter is also made from the resilient plastic, mesh-like material and is a weighted toroid shaped unit connected to the bottom wall 37 of the bag body 28 of the filter 10. As best shown in FIGS. 2 and 6, the base portion 32 includes an upper sheet 40 and a lower sheet 42. These sheets are joined together at two concentric seams 44 and 46. The diameter of upper base sheet 40 is equal to the diameter of the cylindrical body portion 36 of the filter. Prior to completely sealing the upper and lower base sheets together at their concentric seams, a weighted material 48, preferably gravel, of larger dimension than the openings in the mesh-like material of the filter, is placed within the space between the upper sheet 40 and lower sheet 42 created by joining the sheets at the concentric seams 44 and 46. Thereafter, the concentric seams are sealed to each other. The weighted base portion 32 is then sealed to the bottom wall 37 in a conventional manner.

Base portion 32 tends to retain its toroid shape as water flows in the filter bag because the weighted material 48 contained between the two concentric seams 44, 46 remains relatively unperturbed by the water. The toroid shaped base 32, when attached to the filter sidewall 36, urges the sidewall 36 to remain expanded at all times. The weighted base 32 also prevents the filter bag body 28 from being moved or dislodged by the flow of water into it. The filter therefore will remain centered in the sump during operation and provide maximum filtering capacity.

It is to be understood that the dimensions of filter drain sumps can vary greatly, depending upon the locality within which the drain is built, and even upon the individual building contractor. The dimensions of the filter 10 satisfy the requirement for each relative type of storm drain in use. When the sump is larger than the filter, there is obviously no problem. The smaller sump will now be discussed below.

Figure 7:
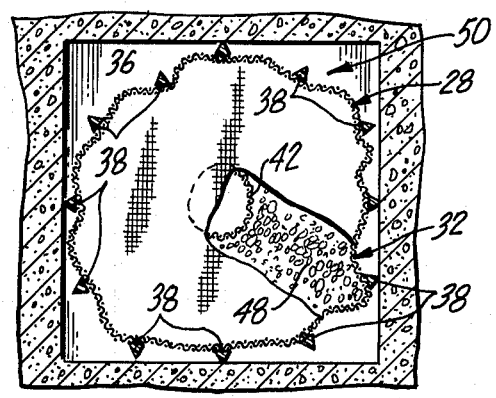
FIG. 7 is a cross-sectional view of the filter bag when used within a sump having interior dimensions which do not allow for the filter bag to open fully.

FIG. 7 shows a sump 50 which is substantially similar to the above-mentioned sump 22. However, the sump 50 is smaller than the previously mentioned sump 22. Accordingly, the resilient mesh-like material of the filter 10 of the present invention allows the bag body 28 to be slightly squeezed together in order to fit into a smaller sump 50 as indicated in FIG. 7. It is noted, that the spacer fins 38 still function to provide a space between the bag body 36 and the walls of the sump 50 in the manner set forth above.

It is further noted that the shape of the base portion 32 can be changed from its relaxed or unrestrained position when disposed in sump 22, shown in FIG. 6, to a restrained position when disposed in sump 50, as indicated in FIG. 7. Accordingly, the resilient, mesh-like material of the base portion 32 and the small size of the weighted gravel material 48 contained therein allows the normal toroid shape to be altered or reshaped so that the base portion 32 can fit into a smaller sump, such as sump 50.

It is further noted, that the spacer fins 38 can be modified to extend the full height of the filter, where such a modification would be an advantage in small sumps. Furthermore, each spacer fin 38 can be a one-piece construction as shown in the drawings, or the longitudinal length thereof can be provided by two or more spacer fins placed end to end. Accordingly, in the above-mentioned modification of extending the spacer fins from the top to the bottom of the filter, all that is necessary is to add an additional fin to each existing fin in order to obtain the desired longitudinal length thereof.

The filter 10, having a lightweight, resilient, mesh-like material, can be easily removed from the sump when filled with residue. It can thereafter be either cleaned and re-used or replaced with another filter.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A filter for use with a drain having a sump and a fluid outlet through a wall of the sump, said filter comprising:
    a bag-like member having a cylindrical body portion and a relatively circular base portion secured to a bottom wall of said cylindrical body portion;
    said bag-like member including upper support means for positioning on an upper perimeter of the sump to align said bag-like member in a downwardly depending relationship in the sump, said support means having opening means for communicating with an interior portion of said cylindrical body portion;
    said bag-like member being fabricated from a resilient mesh-like synthetic material which is relatively non-degradable by water or organic matter, said mesh-like synthetic material providing filtering openings through said bag-like member;
    spacer means secured to an outer surface of said cylindrical body portion of said bag-like member to prevent said cylindrical body portion from abutting against a wall of the sump;
    said spacer means including a plurality of longitudinally extending spacer fins disposed parallel to each other and spaced around said cylindrical body portion, said spacer fins being fabricated from a synthetic material which is relatively non-degradable by water or organic matter;
    said base portion having an opening in a bottom portion thereof to provide a toroid-shaped outer portion;
    weighted means disposed in said toroid-shaped outer portion for maintaining said cylindrical body portion of said bag-like member in a relatively expanded configuration, said weighted means being reshapeable to permit said base portion to be fitted in various sized sumps, said weighted means including a plurality of weighted materials each having a larger dimension than said filtering openings through said bag-like member to retain said weighted materials in said toroid-shaped outer portion.

2. A filter as claimed in claim 1, wherein said spacer fins are wedge-shaped, plastic ribs.

3. A filter as claimed in claim 1, wherein said cylindrical body portion includes a reduced neck portion adjacent to said support means to avoid contact with the fluid outlet of the sump, said spacer fins being disposed below said neck portion and above said base portion.

4. A filter as claimed in claim 1, wherein said base portion of said bag-like member includes a first sheet of filtering material and a second sheet of filtering material, said sheets being joined to each other to provide said toroid shaped outer portion.

5. A filter as claimed in claim 1, wherein said support means includes an upper plate and a lower plate each having a complimentary central opening therethrough to provide said opening means, a plurality of tabs projecting from an upper circumferential edge of a neck portion of said body portion, said tabs disposed through said central opening of said lower plate and being adhered to an upper surface of said lower plate with said upper plate being affixed to said lower plate so that said central openings of said plates are axially aligned with said neck portion of said bag-like member.

* * * * *